(12) United States Patent  (10) Patent No.: US 8,958,794 B2
Narasimha et al.  (45) Date of Patent: *Feb. 17, 2015

(54) EFFICIENT RESELECTIONS IN THE PRESENCE OF CLOSED SUBSCRIBER GROUP CELLS

(71) Applicant: Motorola Mobility LLC, Libertyville, IL (US)

(72) Inventors: Murali Narasimha, Lake Zurich, IL (US); Sandeep H Krishnamurthy, Mountain View, CA (US); Ravi Kuchibhotla, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/863,477

(22) Filed: Apr. 16, 2013

(65) Prior Publication Data
US 2013/0231110 A1 Sep. 5, 2013

Related U.S. Application Data

(63) Continuation of application No. 12/605,759, filed on Oct. 26, 2009, now Pat. No. 8,504,039.

(60) Provisional application No. 61/111,257, filed on Nov. 4, 2008.

(51) Int. Cl.
*H04W 4/00* (2009.01)
*H04W 36/00* (2009.01)
*H04W 48/02* (2009.01)
(Continued)

(52) U.S. Cl.
CPC .......... *H04W 36/0055* (2013.01); *H04W 48/02* (2013.01); *H04W 72/02* (2013.01); *H04W 36/04* (2013.01); *H04W 36/20* (2013.01); *H04W 48/18* (2013.01)
USPC ............................ 455/434; 455/410; 455/525

(58) Field of Classification Search
USPC ........................................................ 455/434
See application file for complete search history.

(56) References Cited

U.S. PATENT DOCUMENTS

2006/0040700 A1\* 2/2006 Roberts et al. ................ 455/525
2008/0004025 A1 1/2008 Lee
(Continued)

FOREIGN PATENT DOCUMENTS

CN 101166133 A 4/2008
WO 2008090154 A1 7/2008

OTHER PUBLICATIONS

The State Intellectual Property Office of the People's Republic of China, Notification of the First Office Action, Apr. 3, 2013, all pages.
(Continued)

*Primary Examiner* — Timothy Pham
(74) *Attorney, Agent, or Firm* — Faegre Baker Daniels LLP

(57) ABSTRACT

A method in a mobile station for avoiding interference to restricted access cells, including detecting presence of a restricted access cell, determining that a measured path-loss is larger than a path-loss threshold, determining that the mobile station is not allowed to access the restricted access cell, and barring a carrier frequency on which the restricted access cell is deployed when the measured path-loss is larger than the path-loss threshold and when the mobile station is not allowed access to the restricted access cell.

8 Claims, 2 Drawing Sheets

(51) Int. Cl.
*H04W 72/02* (2009.01)
*H04M 1/66* (2006.01)
*H04B 7/00* (2006.01)
*H04W 36/04* (2009.01)
*H04W 36/20* (2009.01)
*H04W 48/18* (2009.01)

(56) References Cited

U.S. PATENT DOCUMENTS

| | | | |
|---|---|---|---|
| 2008/0200146 A1* | 8/2008 | Wang et al. | 455/410 |
| 2009/0081970 A1 | 3/2009 | Yavuz et al. | |
| 2009/0104905 A1 | 4/2009 | DiGirolamo | |
| 2010/0074130 A1 | 3/2010 | Bertrand et al. | |
| 2010/0172254 A1 | 7/2010 | Sachs | |
| 2010/0222055 A1 | 9/2010 | Cho et al. | |
| 2010/0323663 A1* | 12/2010 | Vikberg et al. | 455/410 |

OTHER PUBLICATIONS

3GPP TSG RAN WG4#48bis; Sep. 29-Oct. 3, 2008; Edinburgh, UK; LS on Reselection Handling Towards Non-Allowed CSG Cell; R4-082656.

3GPP TSG RAN WG2#63; Aug. 18-22, Jeju, Korea; LS on Reselection Handling Towards Non-Allowed CSG Cell; R2-084891.

3GPP TSG RAN WG2 Meeting #63; Jeju, Korea, Aug. 18-22, 2008; Way Forward for Remaining Idle Mode Issue to HeNB; R2-083840.

3GPP TSG RAN WG2 Meeting #63bis; Prague, Czech Republich, Oct. 18-22, 2008; Report of 3GPP TSG RAN WG2 meeting #63, Jeju, Korea, Aug. 18-22, 2008; R2-085971.

3GPP TSG RAN WG4 #48bis; Sep. 29-Oct. 3, 2008; Discussion of Reselection Handling Towards Non-Allowed CSG Cell (Response to Incoming LS R2-084891); R4-082384.

RAN WG2: "LS on reselection handling towards non-allowed CSG cell", 3GPP Draft; R4-082532, 3rd Generation Partnership Project (3GPP), Mobile Competence Centre; 650, Route Des Lucioles; F-06921 Sophia-Antipolis Cedex; France, no. Scotland, Sep. 24, 2008, all pages.

Rapporteur (Huawei): "Email report on Home-(e)NB mobility, main issues [63_LTE_c01]", 3GPP Draft; R2-085705, 3rd Generation Partnership Project (3GPP), Mobile Competence Centre; 650, Route Des Lucioles; F-06921 Sophia-Antipolis Cedex; France, no. Prague, Czech Republic; Oct. 1, 2008, all pages.

* cited by examiner

EFFICIENT RESELECTIONS IN THE PRESENCE OF CLOSED SUBSCRIBER GROUP CELLS

CROSS REFERENCE TO RELATED APPLICATIONS

The present application is related to U.S. Application No. 61/111,257 filed on 4 Nov. 2008, the contents of which are hereby incorporated by reference and from which benefits are claimed under 35 U.S.C. 119.

FIELD OF DISCLOSURE

The present disclosure relates generally to wireless communications and, more particularly, to reselection in the presence of closed subscriber group cells.

BACKGROUND

Closed Subscriber Group (CSG) cells are used to provide service to small numbers of users. For example, a "home NodeB" can have a small coverage area and provide access only to members of a home. CSG cells are used to provide better service to the user, e.g., higher data rates, and extend coverage of the operator's network. 3GPP is currently defining detailed behavior of CSG cells and the user equipment (UE) behavior in the presence of CSG cells.

CSG cells can be deployed within the coverage area of conventional macro cells and on the same frequency as the macro cells (mixed carrier). Unlike the deployment of the macro cells, detailed RF planning is not done for typical CSG cell deployments. Typically, a user installs a CSG cell at a home or office. Given that a CSG cell bars access to all except a small specific set of UEs, it is possible to have UEs close to the CSG cell that are not allowed to access to the CSG cell. Such UEs will normally be served by the macro cell. UL transmission from such macro cell UEs interferes with the UL transmissions of UEs in the CSG cell. This can cause service degradation for the UEs in the CSG cell. Such degradation may be characterized by dropped calls, lowered data throughput, etc. The interference can result in a higher noise floor in the CSG cell, causing the CSG cell UEs to increase their transmit power to overcome the interference, which in turn interferes with the UL transmission of the macro cell UEs, causing the macro cell UEs to increase their transmit power to overcome the interference, and so on.

3GPP RAN2 and RAN4 have discussed the problem and the following approach to avoid or reduce the interference is being investigated: A macro cell UE that can potentially cause interference to the UL transmissions of CSG cell UEs should be required to bar the frequency and reselect to a different frequency or a different Radio Access Technology (RAT). RAN2 and RAN4 have further discussed how this objective can be accomplished for UEs in the idle mode. In idle mode a UE is generally expected to camp on the "best cell", i.e., the cell that is ranked highest in its reselection ranking. The UE therefore reads system information only from the highest ranked cell. If the highest ranked cell is not suitable to the UE, the UE bars the frequency (all cells on the frequency) for a specified duration.

With the above behavior, in the situation where a UE is near a CSG cell (i.e., the CSG cell is the highest ranked) that the UE is not allowed to access, the UE must reselect to a different frequency. This leads to unnecessary reselections. The following method has been proposed for controlling the reselections: An Intra-frequency reselection indication (IFRI) is transmitted by every CSG cell in its system information message. This indication can be "allowed" or "disallowed". If an idle mode UE finds a CSG cell to be the highest ranked cell, it reads the IFRI from the system information. If the IFRI is set to "disallowed", the UE bars the frequency (behavior is same as when highest ranked cell is not suitable). If the IFRI is set to "allowed", the UE camps on the second highest ranked cell (the macro cell).

The above method can have a substantial battery life impact on a UE as it requires the UE to read system information of those CSG cells that it is not allowed to access via its transceiver. In urban areas there can be numerous CSG cells, which can have a severely adverse effect on battery life. Furthermore, setting the IFRI "correctly" is difficult. If the typical setting of the IFRI is "disallowed" it may very frequently cause a UE to reselect to other frequencies or RATs. If the typical setting of IFRI is "allowed", the UE can remain on the frequency and read system information of CSG cells, causing a significant battery drain.

A modification of the above IFRI method is considered in 3GPP document R4-082384, where it is proposed to signal a differential path-loss threshold from the CSG cell along with the IFRI. A UE computes the difference in measured path-loss between the macro cell and the CSG cell, and if the difference is higher than the signaled path-loss threshold, it obeys the IFRI from the CSG cell. Since such a threshold would have to be signaled by the CSG cell in a system information message, this method also requires the UE to read system information of those CSG cells that the UE is not allowed to access.

The various aspects, features and advantages of the disclosure will become more fully apparent to those with ordinary skill in the art, on careful consideration of the following Detailed Description and the accompanying drawings. The drawings have been simplified for clarity and are not necessarily drawn to scale.

DETAILED DESCRIPTION

A method of managing reselections in the presence of Closed Subscriber Group (CSG) cells is proposed that ensures that UE battery life is not significantly adversely impacted by reducing unnecessary reselection in the UE.

Figure 1:
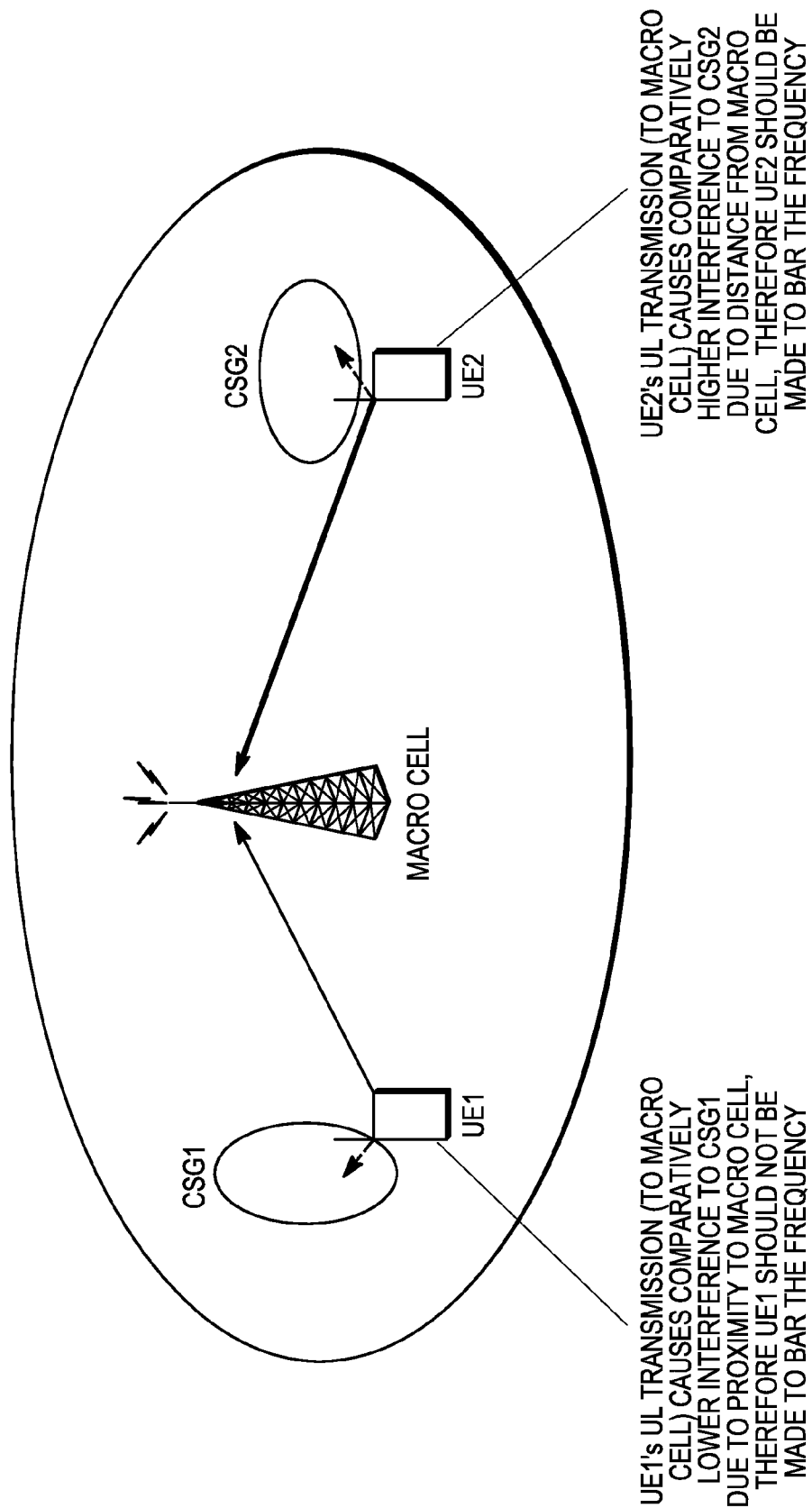
FIG. 1 illustrates the impact of UL interference to CSG cells.

The impact of the UL interference from macro cell UEs on a CSG cell is shown in FIG. 1. The interference caused to the CSG cell by a UE that is at the edge of the macro cell is likely to be more severe than the interference caused by a UE that is close to the macro cell.

According to a first embodiment, the macro cell broadcasts a path-loss threshold. If a UE's measured path loss from the macro cell is larger than the threshold: when the UE encounters a CSG cell that it is not allowed to access and ranks it as the highest, it bars the frequency (and attempts to reselect to a different frequency or RAT). If a UE's measured path loss from the macro cell is smaller than or equal to the threshold: when the UE encounters a CSG cell that it is not allowed to access and ranks it as the highest, it ignores the CSG cell (does not read its system information) and remains on the frequency.

Path-loss can be defined as the difference between the transmit power of the macro cell minus the receive signal power measured by the UE of the signal transmitted by the macro cell, as is well known by those having ordinary skill in the art. More specifically the measured quantity to determine the receive signal power can be the Reference Symbol Receive Power (RSRP). Path-loss can also be defined as the difference between the receive signal power measured by the UE of the signal transmitted by the CSG cell and the receive signal power measured by the UE of the of the signal transmitted by the macro cell.

Embodiment 1 minimizes system information reading of CSG cells the UE is not allowed to access (UE reads system information of only those CSG cells to which it may have access based on the physical layer cell identifier). However, it may still cause some unnecessary reselections. For example, a macro cell UE may reselect upon encountering a CSG cell it cannot access even though there is no CSG UE in the CSG cell which would be impacted by any interference from the macro cell UE. Therefore additional control is provided in a second embodiment by combining the method of embodiment 1 with the use of the IFRI mechanism:

The macro cell broadcasts a path-loss threshold.

CSG cells broadcast an IFRI.

If a UE's measured path loss from the macro cell is larger than the threshold: when the UE encounters a CSG cell that it is not allowed to access and ranks it as the highest, it obeys the IFRI. That is, If the IFRI is set to disallowed it bars the frequency (and attempts reselection to a different frequency or RAT).

If the IFRI is set to allowed it remains on the frequency upon reselecting to the second best ranked cell.

Figure 2:
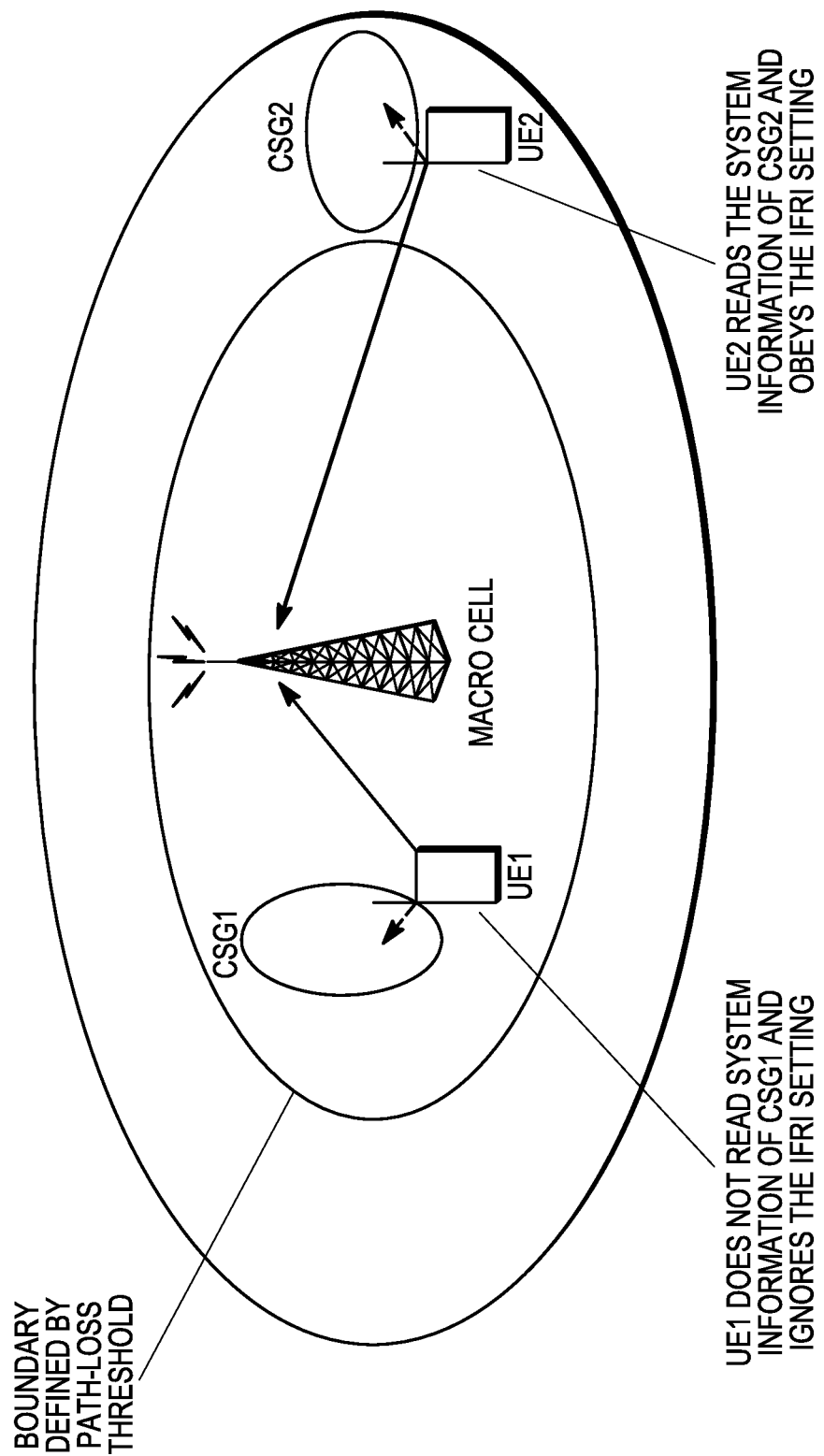
FIG. 2 illustrates a second embodiment.

If the UE's measured path loss from the macro cell is smaller than or equal to the threshold: when the UE encounters a CSG cell that it is not allowed to access and ranks it as the highest, it ignores the CSG cell (does not rank it and does not read its system information) and remains on the frequency FIG. 2 illustrates another embodiment.

While the measured path-loss is larger than the path-loss threshold, the UE may encounter several CSG cells with the IFRI bit set to "allowed" causing the UE to remain on the frequency and continue to read system information of CSG cells. It may not be necessary to read the system information of every CSG cell that is encountered. The following observations regarding the interference caused apply:

The interference caused by a macro cell UE to a CSG cell is only limited to a short duration (at most a few hundred milliseconds). Once the macro eNB obtains measurement reports from the UE, the UE can be handed over to a different frequency or RAT.

A UE that is moving may not benefit from reading the IFRI of an encountered CSG cell because it may remain in idle mode and not have any UL transmissions while in interfering range of the CSG cell.

Thus we propose the following timer based mechanism to minimize the reading of system information from CSG cells:

CSG cells that set IFRI to "allowed" also broadcast a timer value T seconds.

A UE that ranks as highest a CSG cell with IFRI set to allowed does not check the IFRI of any CSG cell for T seconds.

While the present disclosure and the best modes thereof have been described in a manner establishing possession by the inventors and enabling those of ordinary skill to make and use the same, it will be understood and appreciated that there are equivalents to the exemplary embodiments disclosed herein and that modifications and variations may be made thereto without departing from the scope and spirit of the invention, which are to be limited not by the exemplary embodiments but by the appended claims.

What is claimed is:

1. A mobile station comprising:
a wireless transceiver;
the mobile station configured to detect presence of a first restricted access cell, at a first time, and to determine that the mobile station is not allowed to access the restricted access cell, the mobile station configured to determine, from information received from the first restricted access cell via the wireless transceiver, whether intra-frequency reselection is allowed, the mobile station configured to detect presence of a second restricted access cell at a second time, and the mobile station configured to save battery life of the mobile station by checking information received from the second restricted access cell via the wireless transceiver and determine again whether intra-frequency reselection is allowed only if the second time is later than the first time by more than a specified duration.

2. The mobile station of claim 1 wherein detecting the presence of a restricted access cell comprises:
detecting the presence of a cell; and
determining that an identifier of the cell belongs to a set of identifiers corresponding to identifiers of restricted access cells.

3. The mobile station of claim 2 wherein detecting the presence of a cell further comprises:
performing measurements of receive power of a signal of the cell; and
determining, based on the measurements, that the cell is a candidate for reselection.

4. The mobile station of claim 1 wherein the specified duration is defined within the information broadcasted by the second restricted access cell.

5. A method of saving battery in a wireless communication device, the method comprising:
determining that the wireless communication device is not allowed to access a first restricted access cell detected by the wireless communication device at a first time;
determining, from information received from the first restricted access cell via a wireless transceiver, whether intra-frequency reselection is allowed;
determining that the wireless communication device is not allowed to access a second restricted access cell detected by the wireless communication device at a second time, the second time later than the first time; and
checking information received from the second restricted access cell via the wireless transceiver and determining again whether intra-frequency reselection is allowed only if the second time is later than the first time by more than a specified duration.

6. The method of claim 5 wherein determining that the wireless communication device is not allowed to access a restricted access cell comprises:
detecting the presence of a cell; and
determining that an identifier of the cell belongs to a set of identifiers corresponding to identifiers of restricted access cells.

7. The method according to claim 6 wherein detecting the presence of a cell further comprises:
performing measurements of receive power of a signal of the cell; and
determining, based on the measurements, that the cell is a candidate for reselection.

8. The method of claim 5 wherein the specified duration is defined within the information broadcasted by the second restricted access cell.

* * * * *